United States Patent [19]

Tardif

[11] Patent Number: 4,507,009
[45] Date of Patent: Mar. 26, 1985

[54] MEANS AND METHOD FOR PREVENTING CRACKS FROM DEVELOPING IN AN INDUSTRIALIZED HOUSE

[75] Inventor: Jean Tardif, Feuchérolles, France

[73] Assignee: Maisons Phénix, Paris, France

[21] Appl. No.: 571,666

[22] Filed: Jan. 17, 1984

[30] Foreign Application Priority Data

Jan. 20, 1983 [FR] France .............................. 83 00826

[51] Int. Cl.$^3$ .............................................. F16B 5/00
[52] U.S. Cl. ................................... 403/306; 403/305; 52/582
[58] Field of Search ............... 403/306, 405; 411/531; 52/582, 583, 135, 136

[56] References Cited

U.S. PATENT DOCUMENTS

| | | | |
|---|---|---|---|
| 2,334,773 | 11/1943 | Johnson | 403/405 |
| 2,773,671 | 12/1956 | Leibensperger | 403/306 |
| 2,921,462 | 1/1960 | Wilson | 52/583 X |
| 4,030,262 | 6/1977 | Dean | 52/583 |
| 4,080,768 | 3/1978 | Trixl | 52/582 X |

FOREIGN PATENT DOCUMENTS 341959 1/1931 United Kingdom ............... 403/306

Primary Examiner—Andrew V. Kundrat
Attorney, Agent, or Firm—Fisher, Christen & Sabol

[57] ABSTRACT

Means are provided for reinforcing the assembly of facing slabs of an industrialized house. They comprise essentially a fish-plate bridging the joint formed between adjacent slabs. The slabs are provided with holes in which socket-nuts are sunk for engagement by the tightening bolts passing through holes formed in the fish-plate and provided with several radial slits forming as many blades adapted, when the bolts are tightened, in order to provide dome-shaped projections acting as punching means in the cavities. The bolt heads exert a pressure against lugs engaging with one end the flange of a post of the frame structure of the house and with the other end the fish-plate; preferably a distance-piece is provided between the lug and the blades of the corresponding hole.

6 Claims, 2 Drawing Figures

MEANS AND METHOD FOR PREVENTING CRACKS FROM DEVELOPING IN AN INDUSTRIALIZED HOUSE

BACKGROUND OF THE INVENTION

1. Field of the Invention

The present invention relates to means and to a method directed to preventing the opening of joints between facing slabs secured to the posts of the frame structure of an industrialized house.

The function of these means is to counteract the relative movements of the slabs which are caused by shrinking and distortion cycles resulting from temperature variations.

Accessorily, these means, by rigidly assembling on the one hand the face forming slabs and on the other hand the frame structure, permit the including of the facing thus obtained in the calculation of the facade wind-bracing.

The means according to the present invention consist essentially of a fish-plate bridging the joint of which the width is to be controlled, the fish-plate being rigidly secured to the slabs forming said joint with their adjacent edges.

This invention is directed more particularly to means implemented for preventing any movement of the fish-plate in relation to the slabs, in contrast to the conventional plays accepted in the building industry.

It is obvious that the use of standard bolts for fixing the fish-plate to the slabs is not sufficient for safely holding the slabs against movement, were the diameter of the through or blind holes formed in the slabs is substantially greater than the diameter ot the shanks of the corresponding bolts.

2. Summary of the Invention

To avoid this inconvenience, the present invention provides, for the fish-plate and the slabs, additional anchoring means such that a projection of one element engages without play a cavity of the other element.

This playless fitting is obtained according to the instant invention by forming the "projection" on request, i.e. as a function of the corresponding cavity.

This result is obtained by forming the projection coaxially with the hole intended for the fixing bolt, which is formed through the fish-plate. This hole is provided with radial slits providing a weaker area of incipient distortion. The slab cavity is disposed concentrically to the socket-nut engageable by the bolt.

Thus, when the bolt is screwed into the socket-nut, the fish-plate undergoes a distortion and the boss thus formed is driven without play like a punch into the cavity since the latter acts as a die during the plate distortion.

To facilitate this stamping action, a washer is interposed between the bolt head (or an intermediate element) and the fish-plate.

The bolts serve the dual purpose of fixing the fish-plate to the slabs and anchoring the slabs to the posts of the frame structure of the house.

In this case the punch-forming washer is disposed between the fish-plate and the conventional lug disposed under the bolt head.

Other features and advantages of the present invention are set out in the following description proceeds with reference to the attached drawings.

THE DRAWINGS

In the drawing:

FIG. 1 is an exploded perspective view showing the component elements necessary for carrying out a preferred embodiment of the invention, the assembly being shown before tightening the bolts, and FIG. 2 is a horizontal section showing the same component elements after the bolt tightening operation.

DESCRIPTION OF THE PREFERRED EMBODIMENT

Figure 1:
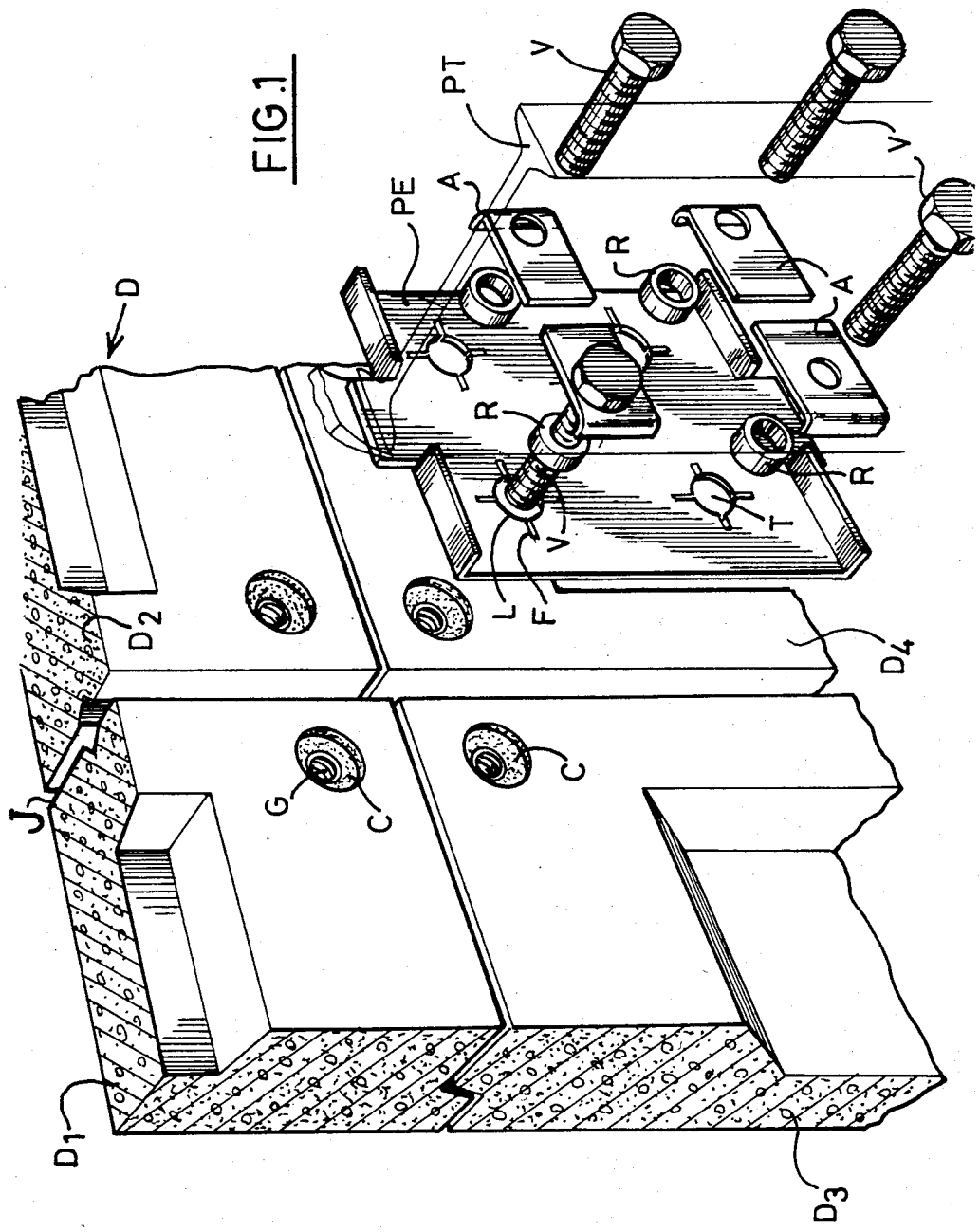
Figure 2:
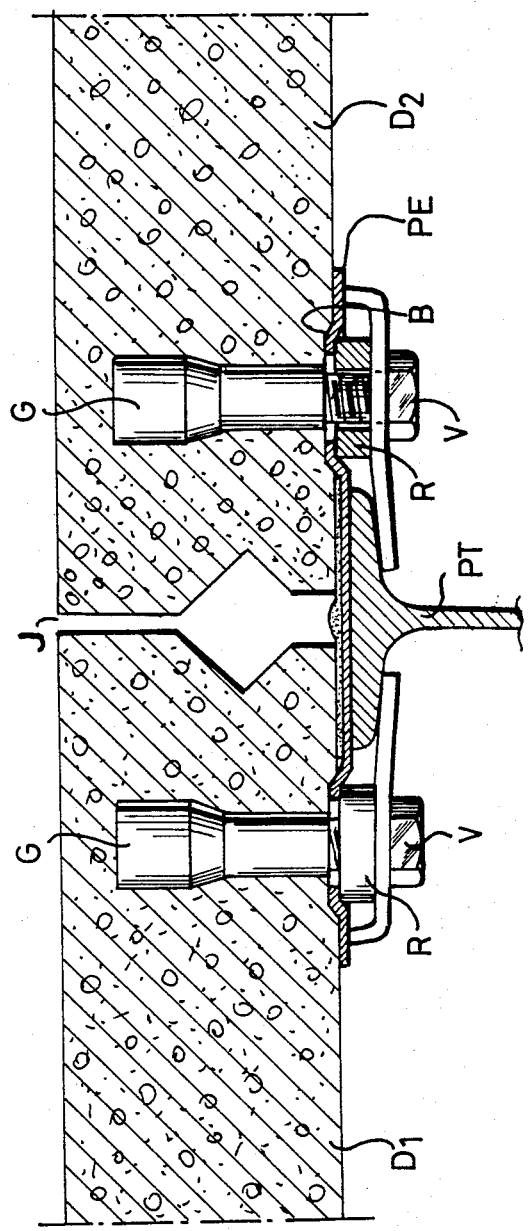

As clearly shown in FIG. 1, each slab D (in an assembly of four slabs $D_1$, $D_2$, $D_3$ and $D_4$) comprises in its marginal areas a cavity C formed integrally with the slab by molding or pressing. Each cavity C, being concentric with an internally tapped ring or socket-nut G, forms an insert adapted to be engaged by the bolt V.

Besides, a fish-plate PE is prepared which comprises at least two holes T provided with radial slits forming as many blades L between them.

The assembly procedure comprises the following steps:

The slabs are so positioned that their joint J is substantially coincident with the vertical axis of the post PT of the frame structure.

As in conventional assemblies, the bolts V are introduced into the holes of the conventional anchoring lugs A so that one end of these lugs bears against the base or flange of the post.

The fish-plate PE is disposed between the slabs D and the post PT, and the washer R is disposed between PE and PT, and The bolts V are screwed and tightened in the socket-nuts G.

It is thus obvious that when the bolts are tightened in the socket-nuts, the washer R acts in the fashion of a punch since it is driven into the slit area surrounding the hole T of fish-plate PE, thus pushing the blades L formed between adjacent slits F into the cavity C of the corresponding slab D.

This cavity acts therefore as a die for stamping the blades L, so that no play can develop between these blades and the cavity into which they are caused to penetrate.

It should be noted that when the washer R has completed its punch function, it acts as a distance-piece for preventing the lug A from being flattened at the end of the bolt tightening step.

Thus, a reliable assembly is obtained between the fish-plate PE and the two adjacent slabs D, forming between them the joint J bridged by the fish-plate.

Of course, the same fish-plate may be disposed at the intersection of a vertical joint with a horizontal joint so as to assemble four slabs $D_1$, $D_2$, $D_3$ and $D_4$ as shown in FIG. 1.

The two functions devolved to the bolts V can be separated:

fixing the fish-plate to the slabs, and fixing the slabs to the posts.

Of course, various modifications and changes may be brought to the specific embodiment of the invention shown and described herein without departing from the basic principles of the invention, as will readily occur to those conversant with the art.

What is claimed as new is:

1. Means for counteracting the opening of joints formed by adjacent edges of facing slabs disposed and secured in front of a post of a carrier frame structure of an industrialized house, wherein a fish-plate is anchored to at least two slabs so as to bridge their common joint, said fish-plate and slabs being provided with complementary anchoring means preventing any independent movement of said slabs, said anchoring means being of the type in which a projection formed on one of the two elements is embedded without play into the other element.

2. Means according to claim 1, wherein said complementary means comprise on the one hand a cavity formed by molding in the rear face of the slab and on the other hand of a boss obtained by deformation of the fish-plate.

3. Means according to claim 2, wherein said boss is obtained by changing the shape of blades resulting from radial slits formed in said fish-plate.

4. Method of carrying out the means for counteracting the opening of joints formed by adjacent edges of facing slabs disposed and secured in front of a post of a carrier frame structure of an industrialized house, wherein a fish-plate is anchored to at least two slabs so as to bridge their common joint, said fish-plate and slabs being provided with complementary anchoring means preventing any independent movement of said slabs, said anchoring means being of the type in which a projection formed on one of the two elements is embedded without play into the other element, wherein said fish-plate is prepared by forming at least two holes permitting the passage of bolts, said holes having radial slits formed therearound for forming therebetween blades adapted to be deformed, whereafter said fish-plate is so placed as to bridge said joint formed between the adjacent edges of two slabs, whereby the holes of said fish-plate are axially aligned with said socket-nuts of said slabs, two bolts being subsequently screwed in by interposing between a member on each of said bolts from one of the group consisting of the head of said bolt and an intermediate element on said bolt, and said fish-plate a washer so that said washer will act like a punch for spreading said blades apart and anchoring them into the slab material at the bottom of said cavity which therefore acts as a punching die.

5. Method according to claim 4 wherein said complementary means comprise on the one hand a cavity formed by molding in the rear face of the slab and on the other hand a boss obtained by deformation of the fish-plate.

6. Method according to claim 5 wherein said boss is obtained by changing the shape of blades resulting from radial slits formed in said fish-plate.

* * * * *